US007961807B2

(12) United States Patent
Kotecha et al.

(10) Patent No.: US 7,961,807 B2
(45) Date of Patent: Jun. 14, 2011

(54) REFERENCE SIGNALING SCHEME USING COMPRESSED FEEDFORWARD CODEBOOKS FOR MULTI-USER, MULTIPLE INPUT, MULTIPLE OUTPUT (MU-MIMO) SYSTEMS

(75) Inventors: Jayesh H. Kotecha, Austin, TX (US); Jayakrishnan C. Mundarath, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 977 days.

(21) Appl. No.: 11/687,441

(22) Filed: Mar. 16, 2007

(65) Prior Publication Data

US 2008/0227495 A1   Sep. 18, 2008

(51) Int. Cl.
*H04B 7/02* (2006.01)
(52) U.S. Cl. ........ 375/267; 375/299; 375/347; 455/101; 455/132
(58) Field of Classification Search .................. 375/267, 375/299, 347; 455/101, 132
See application file for complete search history.

(56) References Cited

U.S. PATENT DOCUMENTS

| | | | |
|---|---|---|---|
| 5,909,649 A | 6/1999 | Saunders et al. | |
| 6,473,467 B1 | 10/2002 | Wallace et al. | |
| 6,968,092 B1 | 11/2005 | Winger | |
| 7,110,463 B2 | 9/2006 | Wallace et al. | |
| 7,139,328 B2 | 11/2006 | Thomas et al. | |
| 7,151,809 B2 | 12/2006 | Ketchum et al. | |
| 7,164,649 B2 | 1/2007 | Walton et al. | |
| 7,505,527 B2 | 3/2009 | Hwang et al. | |
| 7,602,837 B2 | 10/2009 | Kotecha et al. | |
| 7,607,832 B2 | 10/2009 | Kotecha et al. | |
| 2004/0066761 A1* | 4/2004 | Giannakis et al. ............ 370/329 |
| 2004/0076224 A1 | 4/2004 | Onggosanusi et al. | |
| 2004/0108944 A1 | 6/2004 | Lee et al. | |
| 2004/0228423 A1 | 11/2004 | Gueguen | |
| 2005/0009476 A1 | 1/2005 | Wu et al. | |
| 2005/0043031 A1 | 2/2005 | Cho et al. | |

(Continued)

FOREIGN PATENT DOCUMENTS

EP   1453262 A1   1/2004

OTHER PUBLICATIONS

Philips, "Comparison between MU-MIMO codebook-based channel reporting techniques for LTE downlink." R1-062483, Oct. 2006. 3GPP TGS RAN WG1 Meeting #46bis, Seoul.*

(Continued)

*Primary Examiner* — Juan A Torres
(74) *Attorney, Agent, or Firm* — Hamilton & Terrile, LLP; Michael Rocco Cannatti

(57) ABSTRACT

A multi-user multiple input multiple output (MIMO) downlink beamforming system with limited feed forward (200) is provided to enable precoding matrix information to be efficiently provided to a subset of user equipment devices (201.*i*), where zero-forcing transmit beamformers ($w_i$) are computed at the base station (210) and assembled into a precoding matrix (W). The precoding matrix is encoded using a compact reference signal codebook (225, 207.*i*) for forward link signaling, either by sending bits indicating the index of the transmission matrix used, or by transmitting one or more precoded pilots or reference signals wherein the pilot signals are precoded using vectors uniquely representative of the transmission matrix used which includes candidate reference signal matrices which meet a predetermined condition number requirement, such as a condition number threshold.

28 Claims, 4 Drawing Sheets

U.S. PATENT DOCUMENTS

| | | | |
|---|---|---|---|
| 2005/0101259 A1 | 5/2005 | Tong et al. | |
| 2005/0117660 A1 | 6/2005 | Vialle | |
| 2005/0129137 A1 | 6/2005 | Yamada et al. | |
| 2005/0201296 A1 | 9/2005 | Vannithamby et al. | |
| 2006/0072677 A1 | 4/2006 | Kwak et al. | |
| 2006/0092054 A1 | 5/2006 | Li et al. | |
| 2006/0093065 A1 | 5/2006 | Thomas et al. | |
| 2006/0098760 A1* | 5/2006 | Shen et al. | 375/299 |
| 2006/0120478 A1 | 6/2006 | Kim et al. | |
| 2006/0121946 A1 | 6/2006 | Walton et al. | |
| 2006/0155534 A1 | 7/2006 | Lin et al. | |
| 2006/0155798 A1 | 7/2006 | Ketchum et al. | |
| 2006/0205437 A1 | 9/2006 | Sung et al. | |
| 2006/0209980 A1* | 9/2006 | Kim et al. | 375/267 |
| 2006/0279460 A1 | 12/2006 | Yun et al. | |
| 2007/0066571 A1 | 3/2007 | Stockel et al. | |
| 2007/0070967 A1 | 3/2007 | Yang et al. | |
| 2007/0086540 A1* | 4/2007 | Chae et al. | 375/267 |
| 2007/0098106 A1* | 5/2007 | Khojastepour et al. | 375/267 |
| 2007/0099571 A1 | 5/2007 | Withers et al. | |
| 2007/0123254 A1 | 5/2007 | Choi et al. | |
| 2007/0127608 A1 | 6/2007 | Scheim et al. | |
| 2007/0147535 A1 | 6/2007 | Niu | |
| 2007/0191066 A1* | 8/2007 | Khojastepour et al. | 455/562.1 |
| 2007/0195974 A1 | 8/2007 | Li et al. | |
| 2007/0211813 A1 | 9/2007 | Talwar et al. | |
| 2007/0218910 A1 | 9/2007 | Hill et al. | |
| 2007/0223619 A1 | 9/2007 | Lee et al. | |
| 2007/0249296 A1 | 10/2007 | Howard et al. | |
| 2007/0263746 A1* | 11/2007 | Son | 375/267 |
| 2007/0280386 A1* | 12/2007 | Waes et al. | 375/347 |
| 2007/0286304 A1 | 12/2007 | Kim et al. | |
| 2007/0297528 A1 | 12/2007 | Feder et al. | |
| 2008/0008110 A1 | 1/2008 | Kishigami et al. | |
| 2008/0009322 A1 | 1/2008 | Kim | |
| 2008/0013610 A1 | 1/2008 | Varadarajan et al. | |
| 2008/0037464 A1 | 2/2008 | Lim et al. | |
| 2008/0045143 A1 | 2/2008 | Yoshida et al. | |
| 2008/0056414 A1 | 3/2008 | Kim et al. | |
| 2008/0075058 A1 | 3/2008 | Mundarath et al. | |
| 2008/0076370 A1 | 3/2008 | Kotecha et al. | |
| 2008/0080448 A1 | 4/2008 | Huang et al. | |
| 2008/0080449 A1 | 4/2008 | Huang et al. | |
| 2008/0080459 A1 | 4/2008 | Kotecha et al. | |
| 2008/0118008 A1 | 5/2008 | Kotecha | |
| 2008/0159425 A1* | 7/2008 | Khojastepour et al. | 375/260 |
| 2008/0165875 A1 | 7/2008 | Mundarath et al. | |
| 2008/0187062 A1* | 8/2008 | Pan et al. | 375/260 |
| 2008/0188190 A1* | 8/2008 | Prasad et al. | 455/114.3 |
| 2008/0212701 A1* | 9/2008 | Pan et al. | 375/260 |
| 2008/0212702 A1* | 9/2008 | Pan et al. | 375/260 |
| 2009/0016312 A1 | 1/2009 | Tao et al. | |
| 2009/0034480 A1 | 2/2009 | Levin et al. | |
| 2009/0190688 A1 | 7/2009 | Kotecha et al. | |
| 2010/0202553 A1 | 8/2010 | Kotecha et al. | |

OTHER PUBLICATIONS

Philips, "System-level simulation results for channel vector quantisation feedback for MU- MIMO." R1-063028, Nov. 2006.3GPP TGS RAN WG1 Meeting #47, Riga.*

Alcatel, "Link-level results for multiuser eigenmode transmission with limited feedback"; R1-070318 3GG TSG RAN WG1 Meeting #47bis, Sorrento, Italy, Jan. 15-19, 2007, Tdoc R1-070318.*

Love, "Limited feedback precoding for spatial multiplexing systems," Global Telecommunications Conference, 2003. GLOBECOM '03. IEEE vol. 4, Publication Year: 2003, pp. 1857-1861 vol. 4.*

Love, "Limited feedback precoding for spatial multiplexing systems using linear receivers," Military Communications Conference, 2003. MILCOM 2003. IEEE vol. 1 Publication Year: 2003 , pp. 627-632 vol. 1.*

Love, "Limited feedback unitary precoding for orthogonal space-time block codes," IEEE Transactions on Signal Processing, Publication Date : Jan. 2005 vol. 53 , Issue:1 On pp. 64-73.*

Yi, "Beamforming for MIMO systems with limited feedback", 2006 IET International Conference on Wireless, Mobile and Multimedia Networks, Nov. 6-9, 2006 pp. 1-3.*

Mondal, "Frame theoretic quantization for limited feedback MIMO beamforming systems" 2005 International Conference on Wireless Networks, Communications and Mobile Computing, vol. 2, Jun. 13-16, 2005 pp. 1065-1070 vol. 2.*

Alcatel, "Dedicated Reference Signals for MU-MIMO Precoding in E-UTRA Downlink," TSG-RAN WG1 #48, St. Louis, Missouri, Feb. 12-16, 2007, R1-071069.*

Huang, "Multi-antenna limited feedback for temporally-correlated channels: Feedback compression," in Proc. IEEE Global Telecommunication Conference Nov. 2006.*

Philips, "Comparison of MU-MIMO Feedback Schemes with Multiple UW Receive Antennas," 3GG TSG RAN WG1 Meeting #47bis, Sorrento, Italy Jan. 15-19, 2007, Tdoc R1-070346.

Freescale, "Scheme for MU-MIMO in DL EUTRA" R1-070608 (this is an update of R1-070223 and in the document the number was R1-070223), Jan. 2007, 3GPP TGS RAN WG1 Meeting #47bis, Sorrento, Italy.

Freescale, "Overview and Way forward on MIMO Preceding in DL EUTRA" R1-070220 Jan. 2006 3GPP TGS RAN WG1 Meeting #47bis, Sorrento, Italy.

Freescale, "Efficient method for feedback reduction and feedback mechanism for precoded MIMO in EUTRA" R1-070221 Jan. 2006 3GPP TGS RAN WGI Meeting #47bis, Sorrento, Italy.

Freescale, "Aspects orf SU/MU Switching and MU-MIMO in DL EUTRA" R1-070222 Jan. 2006 3GPP TGS RAN WG1 Meeting #47bis, Sorrento, Italy.

Freescale, "Scheme for MU-MIMO in DL EUTRA" R1-070223 Jan. 2006 3GPP TGS WG1 Meeting #47bis, Sorrento, Italy.

S.V. Bana et al., "Space Division Multiple Access (SDMA) for Robust Ad hoc Vehicle Communication Networks," The IEEE Fourth International Conference on Intelligent Transportation Systems, 2001 IEEE Intelligent Transportation Systems.

D.J. Love et al, "Grassmannian Beamforming on Correlated MIMO Channels," IEEE Global Telecommunications Conference, Nov. 3-Dec. 3, 2004.

A. Bourdoux et al., "Joint TX-RX Optimisation for MIMO-SDMA Based on a Null-space Constraint," 2002 IEEE 56th Vehicular Technology Conference.

D.J. Love et al., "Grassmannian Beamforming for Multiple-Input Multiple-Output Wireless Systems," IEEE, 2003.

A.F. Naguib et al, Performance of Wireless CDMA with M-ary Orthogonal Modulation and Cell Site Antenna Arrays, IEEE, Journal on Selected Areas in Communications, vol. 14, No. 9, Dec 1996.

L. Dong et al., "Opportunistic Transmission Scheduling for Multiuser MIMO Systems," IEEE, 2003.

H. Shin et al., "Closed-form Formulas for Ergodic Capacity of MIMO Rayleigh Fading Channels," IEEE, 2003.

M. Torlak et al., "Fast Estimation of Weight Vectors to Optimize Multi-Transmitter Broadcast Channel Capacity," IEEE Transactions on Signal Processing, vol. 46, No. 1, Jan. 1998.

V. Zaharov et al., "Smart Antenna Application for Satellite Communication Systems with Space Division Multiple Access," Journal of Radio Electronics, N. 2, Feb. 5, 2001, printed Oct. 18, 2005.

M. Cooper et al., "Intelligent Antennas: Spatial Division Multiple Access," 1996 Annual Review of Communications, 1996.

G.J. Foschini et al., On Limits of Wireless Communication in a Fading Environment when Using Multiple Antennas, Wireless Personal Communications, vol. 6, 1998, pp. 311-335, http://www1.bell-labs.com/project/blast/wpc-v6n3.pdf.

R. Monzingo et al, Introduction to Adaptive Arrays, Chapter 3, John Wiley & Sons, 1980, pp. 78-151.

U.S. Appl. No. 11/254,392, filed Oct. 20, 2005, Notice of Allowance mailed Sep. 19, 2008.

U.S. Appl. No. 11/254,392, filed Oct. 20, 2005, RCE IDS filed Dec. 16, 2008.

U.S. Appl. No. 11/254,392, filed Oct. 20, 2005, Notice of Allowance mailed Jan. 5, 2009.

U.S. Appl. No. 11/254,392, filed Oct. 20, 2005, RCE Amendment filed Apr. 6, 2009.

U.S. Appl. No. 11/254,392, filed Oct. 20, 2005, Notice of Allowance mailed Jun. 4, 2009.

U.S. Appl. No. 12/419,701, filed Apr. 7, 2009, Preliminary Amendment mailed Apr. 7, 2009.
A. Bourdoux et al, "Joint TX-RX Optimisation for MIMO-SDMA Based on a Null-space Constraint," IEEE Vehicular Technology Conference, vol. 1, 2002.
K. Wong et al, "Performance Enhancement of Multiuser MIMO Wireless Communication Systems," IEEE Transactions on Communications, vol. 50, No. 12, Dec. 2002.
U.S. Appl. No. 11/535,702, filed Sep. 27, 2006, Office Action mailed Oct. 28, 2009.
U.S. Appl. No. 11/535,702, filed Sep. 27, 2006, Response dated Jan. 28, 2010.
U.S. Appl. No. 11/535,702, filed Sep. 27, 2006, Office Action dated May 11, 2010.
U.S. Appl. No. 11/535,702, filed Sep. 27, 2006, Response mailed Aug. 11, 2010.
U.S. Appl. No. 11/535,702, filed Sep. 27, 2006, Final Office Action dated Oct. 27, 2010.
A. Goldmsmith et al., "Variable-Rate Variable-Power MQAM for Fading Channels," IEEE Transactions on Communications, vol. 45, No. 10, Oct. 1997.
D. Love, "Limited Feedback Unitary Precoding for Spatial Multiplexing Systems," IEEE Transactions on Information Theory, vol. 51, No. 8, Aug. 2005.
A. Goldsmith, "The Capacity of Downlink Fading Channels with Variable Rate and Power," IEEE Transactions on Vehicular Technology, vol. 46, No. 3, Aug. 1997.
K. Huang et al., "Effect of Feedback Delay on Limited Feedback for Temporally Correlated Channels," Jul. 2006.
Huang et al., "Joint Beamforming and Scheduling for SDMA Systems with Limited Feedback," Jun. 2006.
K. Huang et al., "Limited Feedback for Temporally-Correlated Channels—Feedback Rate and Delay," Mar. or Jun. 2006.
K. Huang et al., "Markov models for multi-antenna limited feedback systems," Jun. 2006.
K. Huang et al., "Multi-Antenna Limited Feedback for Temporally-Correlated Channels Feedback Compression," Jul. 2006.
K. Huang et al., "Orthogonal Beamforming in SDMA Downlink with Limited Feedback," Jul. 2006.
D. Love et al., "Feedback Methods for Multiple-Input Multiple-Output Wireless Systems," 2004.
P. Chow, "A Practical Discrete Multitone Transceiver Loading Algorithm for Data Transmission over Spectrally Shaped Channels," IEEE Transactions on Communications, vol. 43, No. 2/3/4, Feb./Mar./Apr. 1995.
R. Fischer et al., "A New Loading Algorithm for Discrete Multitone Transmission," Global Telecommunications Conference, GLOBECOM, 1996.
P. Xia et al., "Multiantenna Adaptive Modulation with Beamforming Based on Bandwidth-Constrained Feedback," IEEE Transactions on Communications, vol. 53, No. 3, Mar. 2005.
U.S. Appl. No. 11/536,280, filed Sep. 28, 2006, Office Action mailed Apr. 30, 2009.
U.S. Appl. No. 11/536,280, filed Sep. 28, 2006, Response filed Jul. 30, 2009.
U.S. Appl. No. 11/536,280, filed Sep. 28, 2006, Office Action mailed Nov. 5, 2009.
U.S. Appl. No. 11/536,280, filed Sep. 28, 2006, Response filed Feb. 5, 2010.
U.S. Appl. No. 11/536,280, filed Sep. 28, 2006, Office Action mailed Apr. 27, 2010.
U.S. Appl. No. 11/536,280, filed Sep. 28, 2006, Pre-Appeal Brief filed Jul. 27, 2010.
U.S. Appl. No. 11/536,280, filed Sep. 28, 2006, Notice of Panel Decision mailed Aug. 19, 2010.
U.S. Appl. No. 11/536,280, filed Sep. 28, 2006, Notice of Allowance mailed Aug. 30, 2010.
U.S. Appl. No. 11/536,280, filed Sep. 28, 2006, Request for Continued Examination filed Nov. 30, 2010.
H. Hourani, "An Overview of Adaptive Antenna Systems," S-72.333 Postgraduate Course in Radio Communications (2004/2005), http://www.comlab.hut.fi/opetus/333/2004_2005_slides/Adaptive_antennas_text.pdf, 2004.

U.S. Appl. No. 11/830,4589, filed Jul. 30, 2007, Office Action dated Jul. 15, 2010.
U.S. Appl. No. 11/830,4589, filed Jul. 30, 2007, Response to Office Action mailed Jan. 18, 2011.
B. Hassibi, "An Efficient Square-Root Algorithm for BLAST," Proceedings of the 2000 IEEE International Conference on Acoustics, Speech and Signal Processing, Jan. 27, 2000.
U.S. Appl. No. 11/562,557, filed Nov. 22, 2006, Office Action mailed Oct. 15, 2009.
U.S. Appl. No. 11/562,557, filed Nov. 22, 2006, Response to Office Action mailed Mar. 15, 2010.
U.S. Appl. No. 11/562,557, filed Nov. 22, 2006, Notice of Allowance mailed Jun. 4, 2010.
B. Clerckx, "Space-Time Signaling for Real-World MIMO Channels," Sep. 2005.
R. F.H. Fischer et al., "A New Loading Algorithm for Discrete Multitone Transmission," IEEE 1996.
A. Goldsmith et al., "Variable-Rate Variable-Power MQAM for Fading Channels," IEEE Transactions on Communications, vol. 45, No. 10, Oct. 1997.
A. Goldsmith et al., "Adaptive Coded Modulation for Fading Channels," IEEE Transactions on Communications, vol. 46, No. 5, May 1998.
Z. Hong et al., "Spatial Multiplexing in Correlated Fading via the Virtual Channel Representation," IEEE Journal on Selected Areas in Communications, Jun. 2003.
N. Khajehnouri et al., "A Minimum Co-User Interference Approach for Multi-User MIMO Downlink Precoding," ICASSP 2006.
M. Vu et al., "MIMO Wireless Precoding," www.stanford.edu/~mhv/SPM_MIMO_Wireless_Precoding.pdf, 2006.
Kim et al., U.S. Appl. No. 60/841,246, filed Aug. 31, 2006.
U.S. Appl. No. 11/537,902, filed Oct. 2, 2006, Office action mailed Jul. 14, 2009.
U.S. Appl. No. 11/537,902, filed Oct. 2, 2006, Response filed Oct. 14, 2009.
U.S. Appl. No. 11/537,902, filed Oct. 2, 2006, Notice of Allowance mailed Dec. 2, 2009.
U.S. Appl. No. 12/762,013, filed Apr. 16, 2010, Preliminary Amendment filed Apr. 16, 2010.
N. Jindal, "Finite Rate Feedback MIMO Broadcast Channels," Feb. 2006 ita.ucsd.edu/workshop/06/talks/papers/79.pdf.
U.S. Appl. No. 11/620,203, filed Jan. 5, 2007, Office Action mailed Feb. 28, 2010.
U.S. Appl. No. 11/620,203, filed Jan. 5, 2007, Response filed Apr. 14, 2010.
U.S. Appl. No. 11/620,203, filed Jan. 5, 2007, Office Action mailed Sep. 30, 2010.
A. Bourdoux et al., "Joint TX-RX Optimisation for MIMO-SDMA Based on a Null-space Constraint," IEEE Vehicular Technology Conference, vol. 1, 2002.
Wei et al, Tackling MIMO-OFDMA Feedback Load Through Feedback Encoding, IEEE Wireless Communication Systems, pp. 363-367 (Sep. 6-8, 2006).
U.S. Appl. No. 11/535,679, filed Sep. 27, 2006, Office Action mailed Oct. 27, 2009.
U.S. Appl. No. 11/535,679, filed Sep. 27, 2006, Response filed Jan. 27, 2010.
U.S. Appl. No. 11/535,679, filed Sep. 27, 2006, Office Action mailed Apr. 30, 2010.
U.S. Appl. No. 11/535,679, filed Sep. 27, 2006, Response filed Jul. 30, 2010.
U.S. Appl. No. 11/535,679, filed Sep. 27, 2006, Examiner Interview Summary mailed Oct. 22, 2010.
U.S. Appl. No. 11/535,679, filed Sep. 27, 2006, Supplemental Response filed Oct. 22, 2010.
B. Banister et al., "A Simple Gradient Sign Algorithm for Transmit Antenna Weight Adaptation with Feedback," IEEE Transactions on Signal Processing, vol. 51, No. 5, May 2003.
K. Huang et al., "Joint Beamforming and Scheduling for SDMA Systems with Limited Feedback," Jun. 2006.
K. Huang et al., "Limited Feedback for Temporally-Correlated Channels_Feedback Rate and Delay," Mar. or Jun. 2006.

K. Huang et al., "Markov models for multi-antenna limited feedback systems," ICASSP, Jun. 2006.

J.C. Roh et al., "An Efficient Feedback Method for MIMO Systems with Slowly Time-Varying Channels," IEEE Communications Society, WCNC 2004.

N. Wei et al., Tackling MIMO-OFDMA Feedback Load Through Feedback Encoding, Sep. 6-8, 2006, IEEE Explore, pp. 363-367.

U.S. Appl. No. 11/537,948, filed Oct. 2, 2006, Preliminary Amendment dated Nov. 27, 2006.

U.S. Appl. No. 11/537,948, filed Oct. 2, 2006, Office Action mailed Mar. 18, 2009.

U.S. Appl. No. 11/537,948, filed Oct. 2, 2006, Response to Office Action filed Jun. 18, 2009.

U.S. Appl. No. 11/537,948, filed Oct. 2, 2006, Office Action mailed Sep. 30, 2009.

U.S. Appl. No. 11/537,948, filed Oct. 2, 2006, Response to Office Action filed Dec. 29, 2009.

U.S. Appl. No. 11/537,948, filed Oct. 2, 2006, Office Action mailed Apr. 15, 2010.

U.S. Appl. No. 11/537,948, filed Oct. 2, 2006, Response to Office Action mailed Jul. 15, 2010.

U.S. Appl. No. 11/537,948, filed Oct. 2, 2006, Office Action mailed Aug. 31, 2010.

U.S. Appl. No. 11/537,948, filed Oct. 2, 2006, Response to Office Action mailed Nov. 30, 2010.

* cited by examiner

US 7,961,807 B2

REFERENCE SIGNALING SCHEME USING COMPRESSED FEEDFORWARD CODEBOOKS FOR MULTI-USER, MULTIPLE INPUT, MULTIPLE OUTPUT (MU-MIMO) SYSTEMS

BACKGROUND OF THE INVENTION

1. Field of the Invention

The present invention is directed in general to the field of information processing. In one aspect, the present invention relates to a system and method for communicating reference signal information in wireless multiple input multiple output (MIMO) communication systems.

2. Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method where a transmitter having multiple transmit antennas wirelessly transmits signals to a plurality of receivers, each of which has multiple receive antennas. For example, space division multiple access (SDMA) systems can be implemented as closed-loop systems to improve spectrum usage efficiency. SDMA has recently emerged as a popular technique for the next generation communication systems. SDMA based methods have been adopted in several current emerging standards such as IEEE 802.16 and the 3rd Generation Partnership Project (3GPP) Long Term Evolution (LTE) platform.

FIG. 1 depicts a wireless MIMO communication system 100 that employs SDMA. In MIMO systems, transmitters and receivers are both equipped with multiple antennas. The wireless communication system 100 includes one or more transmitters 101 (e.g., base stations) and one or more receiver stations 102.l-102.m (e.g., subscriber stations), where "m" is an integer representing the number of receiver stations in a given geographic area. Base stations and subscriber stations can be both transmitters and receivers when both base stations and subscriber stations are equipped with a receiver and a transmitter. Base stations generally communicate with multiple subscriber stations. Subscriber stations communicate directly with a base station and indirectly, via the base station, with other subscriber stations. The number of base stations depends in part on the geographic area to be served by the wireless communication system 100. Subscriber systems can be virtually any type of wireless one-way or two-way communication device such as a cellular telephones, wireless equipped computer systems, and wireless personal digital assistants. The signals communicated between base stations and subscriber stations can include voice, data, electronic mail, video, and other data, voice, and video signals.

In an SDMA-MIMO wireless communication system, each base station 101 and subscriber station 102.i includes an array of antennas for transmitting and receiving signals. In SDMA, different subscriber stations share the same time-frequency channel and the separation between them occurs in the spatial dimension. During transmission, the antenna array forms a beam or multiple beams by applying a set of transmit beam forming weights to signals applied to each antenna in the antenna array. A different set of transmit beam forming weights is applied by the base station to each communication with each subscriber station with a goal of minimizing interference between the radio communication devices signals. In some transmission schemes, such as time division duplex (TDD), beam forming between the base station and subscriber stations allows the allocation of the same frequency channel and different time channel to subscriber stations during downlink and uplink. In other transmission schemes, such as frequency division duplex (FDD), beam forming between the base station and subscriber stations allows the allocation of the same time channel and different frequency channel to subscriber stations during downlink and uplink.

As depicted more specifically in FIG. 1, the MIMO system base station 101 uses beamforming to transmit a single data stream (e.g., $s_1$) through multiple antennas, and the receiver combines the received signal from the multiple receive antennas to reconstruct the transmitted data. This is accomplished with "beamforming" weights whereby a signal $s_i$ is processed in a signal processing unit 103.i for transmission by applying a weight vector $w_i$ to the signal $s_i$ and transmitting the result $x_i$ over an array of antennas. The weighting vector $w_i$ is used to direct the signal with the objective of enhancing the signal quality or performance metric, like signal-to-interference-and-noise ratio (SINR) of the received signal. At the receiver, the received signals detected by the array of antennas are processed using a combining vector $v_i$. In particular, the base station 101 has an array of N antennas 105, where N is an integer greater than or equal to m. The base station prepares a transmission signal, represented by the vector $x_i$, for each signal $s_i$, where $i \in \{1, 2, \ldots, m\}$. (Note: lower case bold variables indicate vectors and upper case BOLD variables indicate matrices). The transmission signal vector $x_i$ is determined in accordance with Equation [1]:

$$x_i = w_i \cdot s_i \qquad [1]$$

where $w_i$, is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 105. In addition, the term "$s_i$," is the data to be transmitted to the $i^{th}$ receiver. Each of the coefficients of weight vector $w_i$ may be a complex weight. Unless otherwise indicated, transmission beamforming vectors are referred to as "weight vectors," and reception vectors are referred to as "combining vectors," though in systems having reciprocal channels (such as TDD systems), a combining vector v at a receiver/subscriber station can be used as both a combining vector (when receiving signals from a transmitter/base station) and a weighting vector (when transmitting to a transmitter/base station).

The transmission signal vector $x_i$ is transmitted via a channel represented by a channel matrix $H_i$. The channel matrix $H_i$ represents a channel gain between the transmitter antenna array 105 and the receive antenna array 104.i at the $i^{th}$ subscriber station 102.i. Thus, the channel matrix $H_i$ can be represented by a $N \times k_i$ matrix of complex coefficients, where N is the number of antennas at the base station antenna array 105 and $k_i$ is the number of antennas in the $i^{th}$ subscriber station antenna array 104.i. The value of $k_i$ can be unique for each subscriber station. As will be appreciated, the channel matrix $H_i$ can instead be represented by a $k_i \times N$ matrix of complex coefficients, in which case the matrix manipulation algorithms are adjusted accordingly so that, for example, the right singular vector calculation on a $N \times k_i$ channel matrix becomes a left singular vector calculation on a $k_i \times N$ channel matrix. The coefficients of the channel matrix $H_i$ depend, at least in part, on the transmission characteristics of the medium, such as air, through which a signal is transmitted. A variety of methods may be used to determine the channel matrix $H_i$ coefficients, such as transmitting a known pilot signal to a receiver so that the receiver, knowing the pilot signal, can estimate the coefficients of the channel matrix $H_i$ using well-known pilot estimation techniques. Alternatively, the actual channel matrix $H_i$ is known to the receiver and may also be known to the transmitter.

At the subscriber station 102.$i$, the transmitted signals are received on the $k_i$ receive antennas. For example, the transmission signal vector $x_i$ is transmitted via a channel represented by a channel matrix $H_1$, and is received at the receiver 102.$l$ as a receive signal vector $y_1 = H_1^H x_1 + n_1$ (where n represents noise and any co-channel interference caused by other subscriber stations). More specifically, the received signals for the $i^{th}$ subscriber station 102.$i$ are represented by a $k_i \times 1$ received signal vector $y_i$ in accordance with Equation [2]:

$$y_i = s_i^* H_i^H w_i + \left( \sum_{n=1}^{m} s_n^* H_i^H w_n - s_i^* H_i^H w_i \right) \quad [2]$$

where "$s_i$" is the data to be transmitted to the $i^{th}$ subscriber station 102.$i$, "$s_n$" is the data transmitted to the $n^{th}$ subscriber station 102.$n$, the * superscript denotes the complex conjugation operator, "$H_i^H$" represents the complex conjugate transpose of the channel matrix correlating the base station 101 and $i^{th}$ subscriber station 102.$i$, $w_i$ is the $i^{th}$ transmit weight vector, and $w_n$ is the $n^{th}$ transmit weight vector. The superscript "H" is used herein as a hermitian operator to represent a complex conjugate transpose operator. The $j^{th}$ element of the received signal vector $y_i$ represents the signal received on the $j^{th}$ antenna of subscriber station 102.$i$, $j \in \{1, 2, \ldots, k_i\}$. The first term on the right hand side of Equation [2] is the desired receive signal while the summation terms less the desired receive signal represent co-channel interference. Finally, to obtain a data signal, $z_i$, which is an estimate of the transmitted data $s_i$, a signal processing unit 108.$i$ at the subscriber station 102.$i$ combines the signals received on the k antennas using a combining vector $v_i$ in accordance with Equation [3]:

$$z_i = \hat{s}_i = y_i^H v_i. \quad [3]$$

While the benefits of MIMO are realizable when the receiver 102.$i$ alone knows the communication channel, these benefits are further enhanced in "closed-loop" MIMO systems when the transmitter 101 has some level of knowledge concerning the channel response between each transmitter antenna element and each receive antenna element of a receiver 102.$i$. Precoding systems provide an example application of closed-loop systems which exploit channel-side information at the transmitter ("CSIT"). With precoding systems, CSIT can be used with a variety of communication techniques to operate on the transmit signal before transmitting from the transmit antenna array 105. For example, preceding techniques can be used at the base station 101 to provide a multi-mode beamformer function to optimally match the input signal on one side to the channel on the other side so that multiple users or subscriber stations can be simultaneously scheduled on the same time-frequency resource block (RB) by separating them in the spatial dimension. This is referred to as a space division multiple access (SDMA) system or as a multi-user (MU)-MIMO system.

While full broadband channel knowledge may be obtained at the transmitter 101 by using uplink sounding techniques (e.g., with Time Division Duplexing (TDD) systems), most precoded MIMO systems (e.g., with TDD or Frequency Division Duplexing (FDD) systems) use channel feedback techniques to measure channel information at the receiver 102.$i$ and then feed back the measured channel information to the transmitter 101. However, it is difficult to accurately measure the channel information or associated channel characteristics (such as SINR or channel quality information (CQI)) for a particular receiver when the communication status of other receivers in the vicinity is not known. In an SDMA system, this results from the fact that signal information being sent to other receivers can appear as interference or noise at the intended receiver 102.$i$, though the receiver can not be expected to have this knowledge when the channel characteristics are being measured. To address the fact that each receiver station has incomplete knowledge about the transmission conditions when the channel information is being measured, the transmitter station 101 can feed forward the precoding matrix information $W = [w_1, w_2, \ldots w_m]$ that is computed based on the channel feedback information from the receiver stations 102.$l$-102.$m$. However, the signaling overhead associated with feeding forward the precoding matrix information to each receiver station can be quite large, especially when the precoding matrix information can be arbitrarily computed as a function of the channel vector feedback information from each receiver station. Moreover, the limited feed forward resources require that any practical system be designed to have a low feed forward rate, while existing systems for feeding forward precoding matrix information can have unacceptably high feed forward data rates.

Accordingly, there is a need for an improved system and methodology for signal processing and control signaling in a MIMO-SDMA system. There is also a need for a multi-user MIMO system which efficiently conveys precoding matrix information to a particular receiver without requiring advance knowledge of the other receivers or the base station scheduling algorithm. In addition, there is a need for a family of signal processing algorithms for generating transmit and receive array vectors for MIMO-SDMA which overcomes limitations in the feed forward data rate and other problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
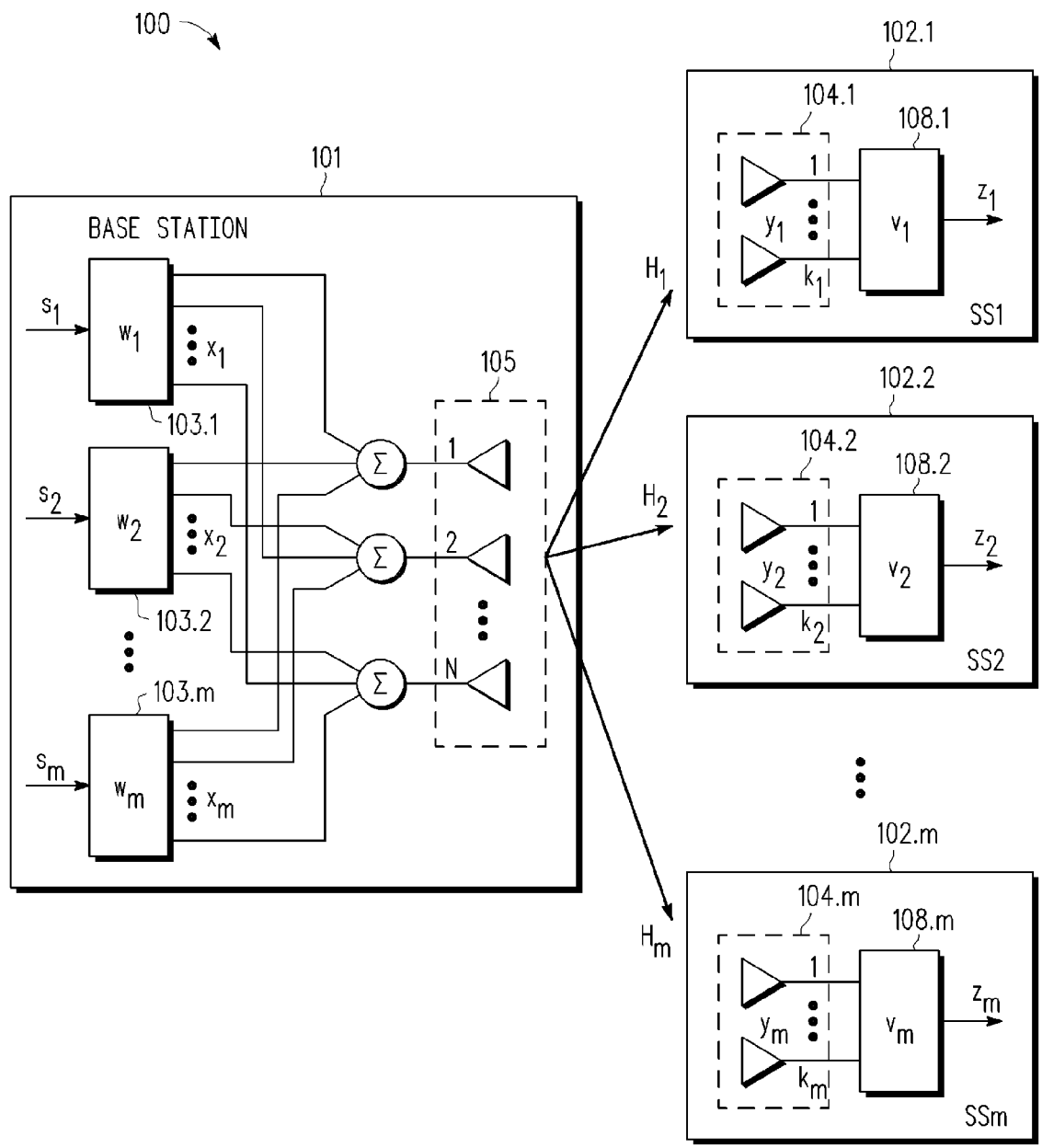
FIG. 1 (labeled prior art) depicts a wireless communication system.

A finite rate feed forward system and methodology are described for use in efficiently providing preceding matrix information to receivers in a wireless, multi-user, multi-input, multiple output (MIMO) SDMA system. Using codebook-based techniques to feed forward preceding information that is generated using predetermined zero-forcing beamforming (ZFBM) techniques, multi-user beamforming transmission is enabled. In selected embodiments, a compressed codebook is shared at the transmitter and receiver to efficiently provide forward link signaling to each receiver by feeding forward index information from the transmitter to the receiver that identifies the preceding matrix information generated at the transmitter for use by each receiver in generating receive beamforming vectors. Alternatively, the compressed codebook can store all possible preceding vectors, and the receiver can use the codebook to evaluate a received precoded reference signal and infer therefrom the transmission beamforming matrix by estimating the preceding vectors used to transmit the precoded reference signal. The compressed codebook of preceding matrix information may be designed by first generating a predetermined set of candidate beamforming matrices using a predetermined zero-forcing beamforming algorithm, and then removing one or more unlikely or sub-optimal beamforming matrices from the predetermined set of candidate beamforming matrices. Beamforming matrices formed from combinations of code vectors which have a low probability of begin scheduled may be identified for removal by associating a performance metric with each candidate transmission matrix and by defining a minimum or maximum threshold for the performance metric and by subsequently eliminating candidates that do not meet the threshold. The performance metric may be chosen to be representative of the sum-capacity or the aggregate data rate that can be potentially achieved with each transmission matrix. An example performance metric would be to calculate a condition number for each matrix and then remove any matrix having a condition number that exceeds a predetermined threshold, where the threshold may be fixed or dynamically programmable or variable. By sharing the compressed codebook of preceding matrix information at the transmitter and receivers, a signaling scheme is provided that allows the transmitter to choose the appropriate transmit beamforming vectors $w_i$ for each receiver and then feed forward transmit beamforming vector matrix information W for each receiver using a reduced feed-forward index. At each receiver, the transmit beamforming vector matrix information W may be used to design the receive beamformer $v_i$ for the receiver.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
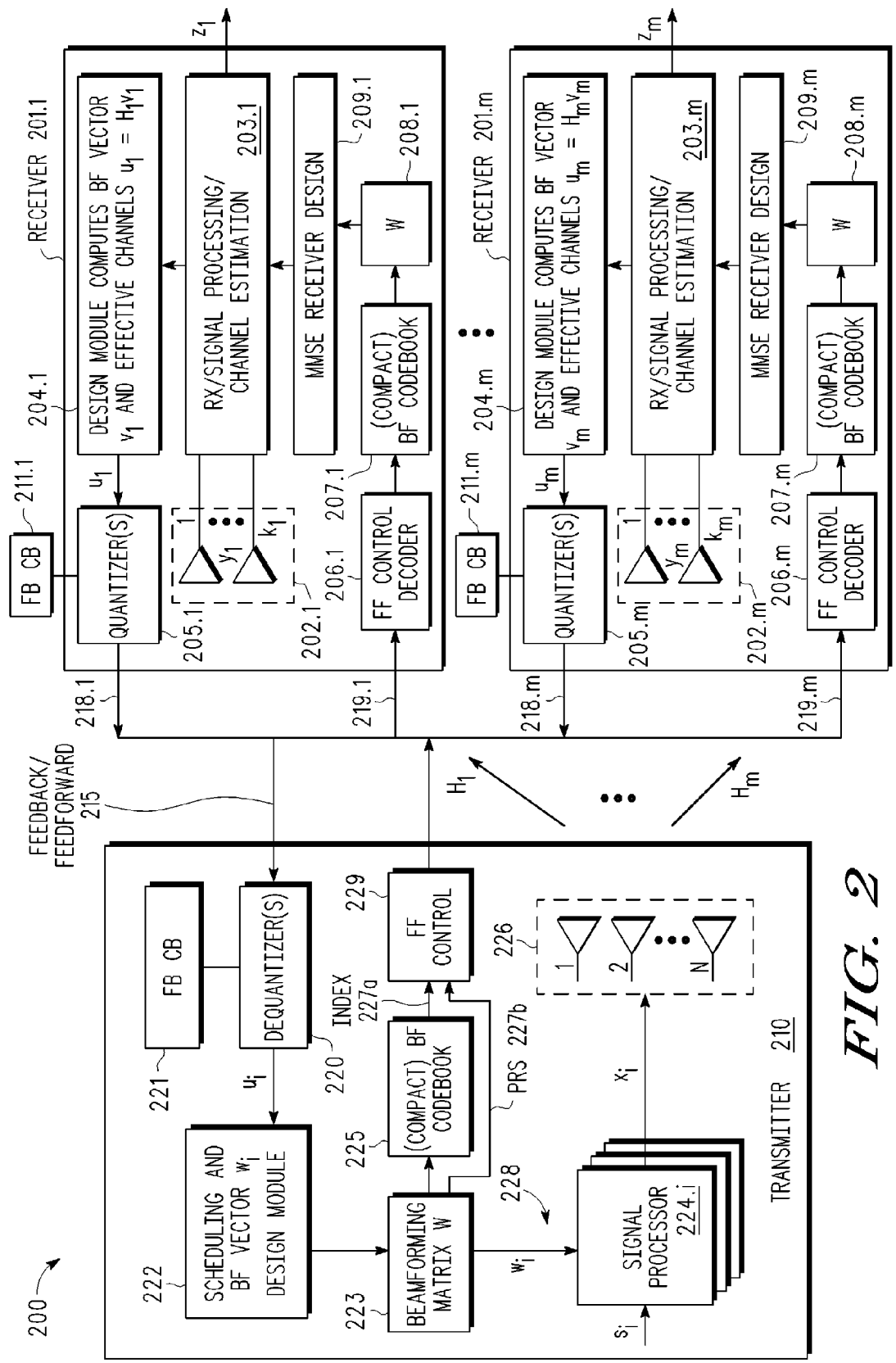
FIG. 2 depicts a wireless communication system in which limited feed forward codebooks are used to convey downlink transmit beamforming matrix information to each receiver station.

FIG. 2 depicts a wireless communication system 200 in which feed forward reference signal codebooks 225, 207.i are used to convey downlink transmit beamforming matrix information from a transmitter 210 (e.g., a base station) to one or more receivers 201.l through 201.m (e.g., subscriber stations), where the reference signal codebooks 225, 207.i are compressed to remove sub-optimal or unlikely transmit beamforming matrices so that a reduced bit indexing scheme may be used to feed forward codebook information. The transmitter 210 includes an array 226 of antennas for communicating with the receivers 201.l through 201.m, each of which includes an array 202.i of antennas for communicating with the transmitter 210. In operation, a data signal $s_i$ presented at the transmitter 210 for transmission to the receiver 201.i is transformed by the signal processor 224.i into a transmission signal represented by the vector $x_i$. The signals transmitted from the transmit antenna 226 propagate through a matrix channel $H_i$ and are received by the receive antennas 202.i where they are represented by the vector $y_i$. For a MIMO channel from the transmitter 210 to the $i^{th}$ receiver 201.i, the channel is denoted by $H_i$, i∈{1, 2, ..., m}. The channel matrix $H_i$ may be represented as an N×$k_i$ matrix of complex entries representing the complex coefficients of the transmission channel between each transmit-receive antenna pair, where N represents the number of transmitter 210 antennas, and $k_i$ represents the number of antennas of the $i^{th}$ receiver 201.i (or vice versa). At the receiver 201.i, the signal processing unit 203.i processes the $y_i$ signals received on the k antennas to obtain a data signal, $z_i$, which is an estimate of the transmitted data vector $s_i$. The processing of the received $y_i$ signals may include combining the $y_i$ signals with appropriate combining vector information $v_i$ generated by the minimum mean square error (MMSE) receiver design module 209.i, where the combining vector information $v_i$ may be computed or chosen at the receiver 201.i based on the transmit beamforming vector matrix information W conveyed to the receiver 201.i using any desired zero-forcing receiver technique.

Transmit beamforming or precoding at the transmitter may be implemented by having each receiver 201.i determine its MIMO channel matrix $H_i$—which specifies the transmission channel between a transmitter and an $i^{th}$ receiver—in the channel estimation signal processing unit 203.i. For example, in a MIMO implementation, each receiver 201.l through 201.m determines its MIMO channel matrix $H_i$ by using pilot estimation or sounding techniques to determine or estimate the coefficients of the channel matrix $H_i$. Each receiver 201.i uses the estimated MIMO channel matrix or other channel-related information (which can be channel coefficients or channel statistics or their functions, such as a precoder, a beamforming vector or a modulation order) to generate or compute an initial receive or combining beamforming vector $v_i$. For example, a receive beamforming design module 204.i at each receiver 201.i computes an initial or optimal receive beamforming vector $v_i$ that represents an optimal blind receive beamforming vector, such as by maximizing a predetermined receive signal-to-interference-and-noise (SINR) metric. Alternatively, the receive beamforming vector $v_i$ for the receiver 201.i is derived from or is generated to be substantially equivalent to a right singular vector corresponding to the maximum singular value of the channel matrix between the transmitter 210 and the receiver 201.i (e.g., $v_i$=RSV$_{max}$ ($H_i$)). However computed, the initial beamforming vector $v_i$ is used to generate effective channel information in the design module 204.i, such as by computing or selecting a vector codeword $u_i$ representing the vector quantity $Hv_i$. As will be appreciated, each receiver 201.i may compute and feed back other information in addition to, or in place of effective channel information $u_i$, such as channel quality information (CQI) or any other information that may be used at the transmitter to generate reference signal information, such as precoding matrix W information.

Rather than feeding back the entire scalar, vector or matrix representation of the effective channel information (such as the selected codeword $u_i$ or the full CQI values which would require a large number of bits), the receiver 201.i uses a quantizer 205.i to quantize the effective channel information $u=H_i v_i$ that is generated by the design module 204.i and that will be used by the transmitter 210 in controlling signal transmission to the receiver 201.i. For example, in quantizing the effective channel information u, a feedback codebook 211.i at the receiver 201.i may be used to store an indexed set of possible codewords u so that the codewords u generated by the vector design module 204.i can be used by the quantizer 205.i to retrieve an index from the feedback codebook 211.i and provide the retrieved index over a feedback channel 218.i (e.g., a low rate feedback channel 215) to the transmitter 210.

Once the effective channel information from a receiver 201.i—such as the selected codeword $u_i$ and CQI value(s)—are indexed and fed back to the transmitter 210 over the low rate feedback channel 215, the transmitter 210 decodes or dequantizes the indexed feedback information using a codebook-based dequantizer 220 which accesses a feedback codebook 221 to obtain the effective channel information (e.g., $u_i$) for the receiver 201.i. As will be appreciated, the transmitter feedback codebook 221 is the same as the feedback codebook 211.i used at the receiver 201.i. The retrieved effective channel information is provided to the design module 222 which computes scheduling information and designs the transmit beamforming vectors $w_i$ for each receiver 201.i When the selected codeword $u_i$ computed by the receiver 201.i represents the receiver's effective channel, $u_i = H_i v_i / \|H_i v_i\|$, the design module 222 at the transmitter 210 uses zero-forcing beamforming (ZFBF) (or variants thereof such as regularized zero-forcing beamforming) to design each transmit beamforming vector $w_i = \tilde{w}_i / \|\tilde{w}_i\|$ such that $$\tilde{w}_i^H u_j = \begin{cases} 1 & \text{if } i=j \\ 0 & \text{if } i \neq j \end{cases}. \quad [6]$$

One possible solution to Equation 6 is given by:

$$\tilde{W} = X(X^H X)^{-1} \quad [7]$$

where $X=[u_1 u_2 \ldots u_k]$, where each of $u_i$ are from a pre-defined vector codebook used for vector channel feedback. This ensures that interference to a user due to the other users' transmissions is zero.

Once the design module 222 designs the transmit beamforming vectors $w_i$ for each receiver 201.i, the design module 222 provides the designed transmit beamforming vectors $w_i$ 228 contained in the precoding information 223 to one or more signal processors 224.i where they are applied to precode the data input signal $s_i$ in the course of generating the transmit signal $x_i$ which is transmitted over the transmit antenna array 226 to the receiver 201.i. However, before using the precoding information 223 to control signal transmission to the receivers 201.i, the transmit beamforming vectors $w_i$ are assembled in the form of a beamforming matrix $W=[w_1, w_2, \ldots w_m]$ which is effectively conveyed over a feed forward channel to the receivers 201.i. Forward link signaling can either be done by sending bits indicating the index 227a of the transmission matrix used, (i.e. by transmitting bits representing index 'i' where i=1, 2, ..., M, on the forward link control channel), or by transmitting one or more precoded pilots or reference signals 227b wherein the pilot signals are precoded using vectors uniquely representative of the transmission matrix used. For example, in quantizing the reference signal information W, a beamforming codebook 225 at the transmitter 210 may be used to store an indexed set of candidate beamforming matrices $W_1, W_2, W_3, \ldots W_M$, so that the reference signal information W generated by the scheduling and vector design module 222 can be used to retrieve an index 227a from the beamforming codebook 225. When index bits 227a are transmitted, the receiver 201.i unit looks up the index in its codebook 207.i and retrieves the transmission matrix. Alternatively, precoded pilot or reference signals 227b (shown as bypassing the feed forward codebook 225) may be transmitted, in which case the receiver 201.i evaluates the received signals against all possible candidate precoding (pilot) vectors stored in the codebook 207.i and infers the transmission matrix W based on the receiver's estimation of the precoding vector(s) used to transmit the pilot(s). In either feed forward scenario, a feed forward control field generator 229 transmits the reference signal (e.g., index 227a or PRS 227b) over a feed forward channel 219.i (e.g., a low rate feed forward channel 215) to the receivers 201.i.

Once the reference signal information 227 (e.g., index 227a or PRS 227b) is fed forward to the receiver 201.i over the low rate feed forward channel 215, the receiver 201.i decodes the feed forward signal 227 with the feed forward control decoder 206.i. The decoded feed forward signal 227 is then used to access a receiver beamforming codebook 207.i to obtain the reference signal information (e.g., W) generated by the transmitter 210. As will be appreciated, bits-based reference signaling requires greater control bandwidth with minimal decoding complexity, insofar as the index bits that are fed forward require a single codebook lookup. Alternatively, by using a precoded pilot or reference signal to feed forward precoding information, multi-user beamforming transmission is enabled with low control bandwidth but higher decoding complexity since all possible candidate pre-coding pilots vectors have to be evaluated. The retrieved reference signal information is provided to the MMSE receiver design module 209.i which computes the adjusted combining vector $v_i$ for the receiver 201.i. The adjusted combining vector $v_i$ is used by the receiver signal processing unit 203.i to process the $y_i$ signals received on the k antennas to obtain a data signal, $z_i$ by combining the $y_i$ signals with the adjusted combining vector information $v_i$.

As will be appreciated, the receiver beamforming codebook 207.i is the same as the beamforming codebook 225 used at the transmitter 210. As indicated with the parenthesis, the beamforming codebook 225 may be a compressed codebook by eliminating unlikely candidate transmission matrices from the codebook—that is candidates formed from combinations of code vectors which have a low probability of begin scheduled. In particular, compressed precoding matrix codebooks 207.i, 225 may be designed by generating a predetermined set of candidate beamforming matrices $W_1, W_2, W_3, \ldots W_M$, using a predetermined zero-forcing beamforming algorithm, and then removing one or more unlikely or sub-optimal beamforming matrices from the predetermined set of candidate beamforming matrices. By compressing the codebook, the control bandwidth requirements may be reduced (in case of bits-based reference signaling) and/or the decoding complexity may be reduced (in case of pre-coded pilot-based reference signaling).

While any desired filtering or culling technique may be used, in selected embodiments, unlikely candidates are identified by associating a performance metric with each candidate transmission matrix and by defining a minimum or maximum threshold for the performance metric so that candidates that do not meet the threshold are eliminated. In various embodiments, the threshold may be fixed or dynamically programmable or variable, and the performance metric may be chosen to be representative of the sum-capacity or the aggregate data rate that can be potentially achieved with each transmission matrix. For example, beamforming matrices may be identified for removal by calculating a condition number for each matrix and then removing any matrix having a condition number that exceeds a predetermined threshold. As will be appreciated, the condition number associated with a problem is a measure of that problem's amenability to digital computation. The condition number k of a matrix Y is a measure of how close the matrix Y is to being singular, and may be computed as $k(Y)=\max(eig(Y))/\min(eig(Y))$. Matrices with condition numbers near 1 are said to be well-conditioned, while matrices with condition numbers much greater than one are said to be ill-conditioned.

An example implementation of how a condition number performance metric may be used is now described. First, the transmitter designs the transmit beamforming matrix W using a predetermined beamforming algorithm (e.g., $W=f(X)$) so that W is the transmission matrix corresponding to the combination of codewords defined by X, where $X=[u_1\ u_2\ \ldots\ u_k]$ and where each of $u_i$ is from a pre-defined vector codebook 211.$i$ used for vector channel feedback. In an example implementation, f(.) denotes a (regularized) zero-forcing function as defined in Equation (7). Note that for each X, there is a corresponding W, and for each candidate W, there is a corresponding candidate X. With this arrangement, a number of different performance metrics may be used. In a first example, the performance metric is the condition number of $W^H W$. In a second example, the performance metric is the condition number of $X^H X$. In yet another example, the performance metric is the condition number of $|w_1 u_1|^2 + |w_2 u_2|^2 + \ldots + |w_k u_k|^2$, where $w_i$ is $i^{th}$ column of the candidate matrix W being evaluated.

Figure 3:
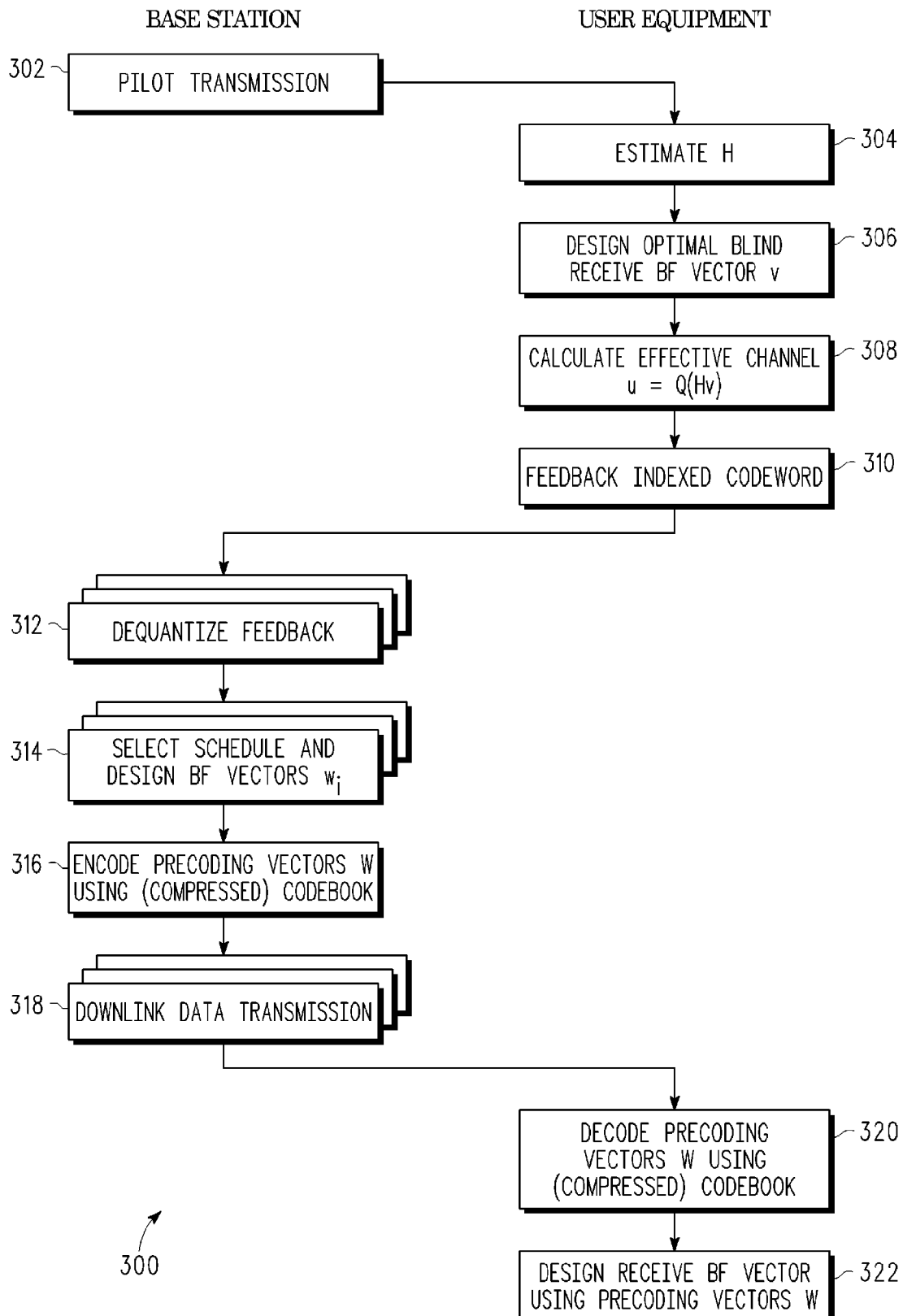
FIG. 3 depicts a first example flow for a precoding methodology for generating and feeding forward preceding matrix information to one or more user equipment devices.

FIG. 3 depicts a generalized precoding methodology 300 for generating and feeding forward preceding matrix information to one or more user equipment devices. As a preliminary step, the MIMO transmission channel to a given receiver station is estimated by transmitting a pilot signal from the transmitter or base station (step 302) to the receiver or user equipment where the transmission channel is estimated (step 304). Generally, a transmission channel can be estimated by embedding a set of predetermined symbols, known as training symbols, at a base station and processing the training symbols at the user equipment to produce a set of initial channel estimates. In this example, the MIMO transmission channel being estimated at the user equipment may be characterized as a channel matrix H.

Based on the channel estimate information, the user equipment designs or computes an optimal blind receive beamforming vector v (step 306). This may be implemented by taking the singular value decomposition (SVD) of the MIMO channel matrix $H=U\Lambda V^H$, where the matrix U is a left singular matrix representing the transmit signal direction, the matrix $\Lambda$ represents the strength (or gain) of the channel and the matrix V is a right singular matrix representing the receive signal direction. The user equipment also uses the channel estimate information H to compute the effective channel vector information (step 308), such as by computing or selecting a codeword u. The receive beamforming vector v and codeword u may be computed in a variety of different ways. For example, they may be designed by selecting the values v and $u=Q(Hv)$ that maximize a predetermined performance metric, where Q(.) is some quantization function. However determined, the codeword u is indexed and fed back to the base station at step 310. As disclosed herein, codebook-based feedback indexing techniques may be used to quantize the codeword u where the base station and user equipment share the same feedback codebook.

At the base station, the feedback information from the user equipment is dequantized (step 312) into the effective channel vector information (e.g., requested codeword u). The dequantized effective channel vector information is used by the base station to design the transmit beamforming vectors $w_i$ using regularized ZFBF design module (step 314), though the dequantized effective channel vector information may also be used to select an appropriate modulation and coding level in systems that implement adaptive modulation and coding (AMC) mechanisms. Once the transmit beamforming vectors $w_i$ are designed, the base station assembles the vectors $w_i$ into a reference signal (e.g., preceding vector matrix W), and then encodes the reference signal using a feedforward codebook for forward link signaling (step 316), either by sending bits indicating the index of the transmission matrix used, (i.e. by transmitting bits representing index 'i' where i=1, 2, ..., M, on the forward link control channel), or by transmitting one or more precoded pilots or reference signals wherein the pilot signals are precoded using vectors uniquely representative of the transmission matrix used. The reference signal information (in either index bits or precoded pilot signal form) is then fed forward to the user equipment devices as part of the downlink data transmission (step 318).

At the user equipment, the encoded reference signal from the base station is decoded to obtain the preceding vector matrix W (step 320). This may be done by using the representative index value to access the feed forward codebook, or by evaluating the received precoded pilot signal(s) against all possible candidate preceding pilot vectors stored in a receiver codebook, and computing the transmission matrix based on the receiver's estimation of the preceding vector(s) used to transmit the pilot(s). The extracted preceding vector matrix W information is used by the user equipment to design the receive beamforming vectors $v_i$ for the user equipment (step 322), such as by using an MMSE receiver to derive the receive beamforming vectors $v_i$. As will be appreciated, the base station and user equipment device(s) share the same feed forward codebook. In addition, the feed forward codebook may be a compressed codebook, as indicated with the parenthesis. In particular, compressed codebooks may be designed by removing sub-optimal beamforming matrices from a predetermined set of candidate beamforming matrices $W_1, W_2, W_3, \ldots W_M$, where the sub-optimal matrices are identified by determining which matrices fail a predetermined performance test. For example, matrices that have a condition number that exceeds a predetermined threshold may be removed from the predetermined set of candidate beamforming matrices, thereby forming a compressed codebook.

Figure 4:
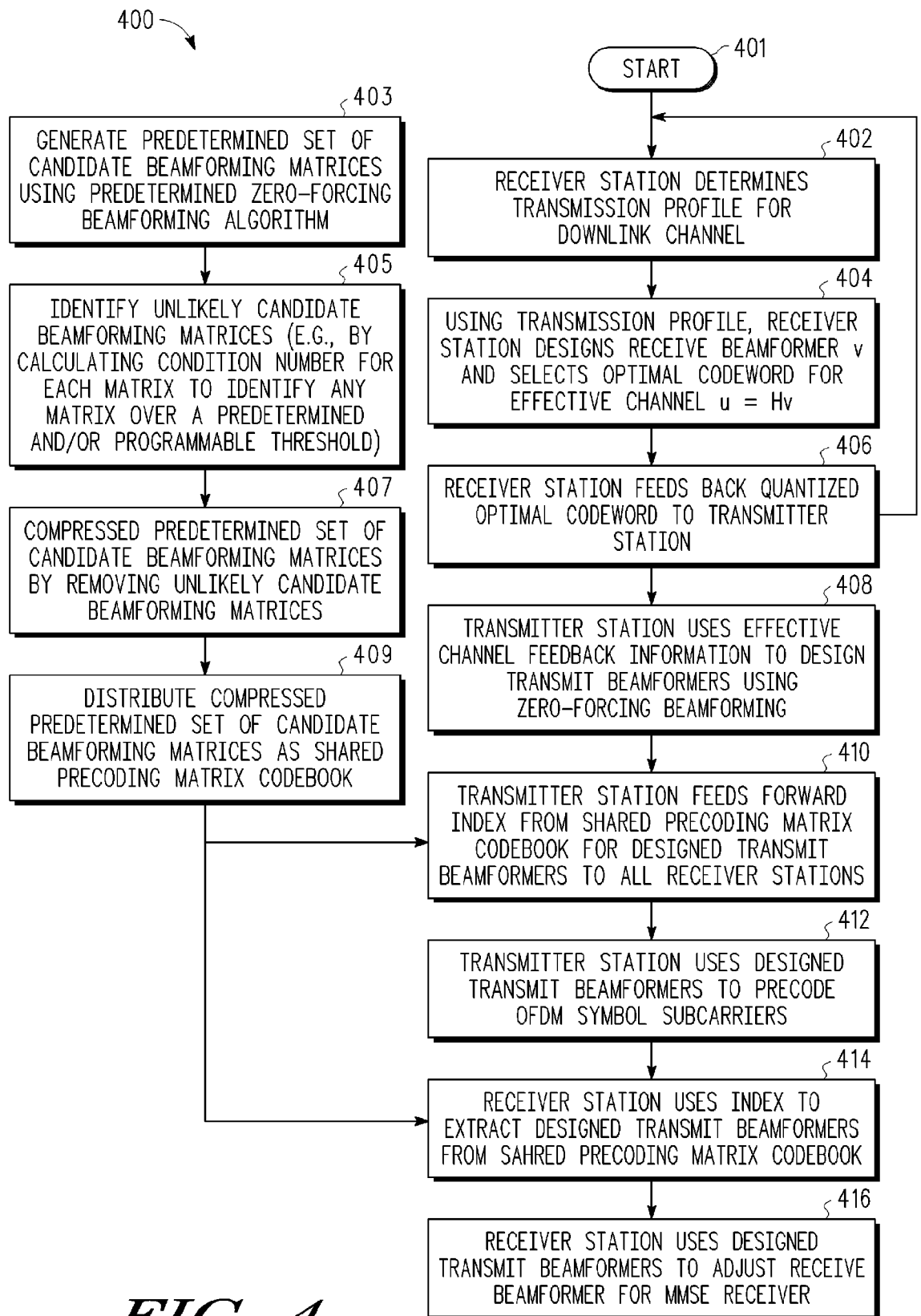
FIG. 4 depicts an example flow for designing and using a compressed zero-forcing beamforming preceding matrix codebook in a multi-user MIMO system.

Selected embodiments of the present invention may also be illustrated with reference to FIG. 4, which depicts an example flow 400 for designing and using a compressed zero-forcing beamforming preceding matrix codebook in a multi-user MIMO system. As depicted, the process starts (step 401) when the receiver station determines the transmission channel profile based on the estimated channel information for the MIMO transmission channel (step 402). Based on the channel profile information, the receiver station designs its optimal blind receive beamformer v and selects an optimal codeword u=Hv (step 404) to represent the effective channel to the receiver station. In an example implementation, the vectors u and v may be jointly designed by selecting candidate values from a codebook of indexed preceding parameters that maximize a predetermined performance metric for estimating the receive SINR, where the metric is defined to reduce quantization errors resulting from the codebook-based selection process. To account for the fact that the receiver station does not have prior knowledge about potential interference from other receiver stations, the receiver station uses the computed vector v as an initial receive beamforming vector. After quantizing the optimal codeword u (such as by using a codebook of indexed values to retrieve a corresponding index), the indexed effective channel information is then communicated as a feedback signal over the feedback control channel to the transmitter station (step 406) and the receiver repeats the foregoing sequence during the next design cycle (as indicated by the feedback line to step 402).

At the transmitter station, the feedback signals from the receiver stations are decoded to generate effective channel information for each receiver station, and this information is used to design transmit beamformers $w_1, w_2, \ldots w_m$ using zero-force beamforming techniques (step 408). The transmitter then assembles the transmit beamformers $w_1, w_2, \ldots w_m$ into a preceding matrix W which fed forward to the receiver stations using a compressed preceding matrix codebook that is shared by the transmitter and receiver stations (step 410).

At this point, precoding matrix codebook design steps will have already been completed so that the preceding matrix codebook can be distributed to the transmitter and receiver stations (as indicated by the lines connecting block 409 to blocks 410 and 414). With the distributed precoding matrix codebooks at the transmitter and receiver stations, the transmitter station uses the designed transmit beamformers to precode the orthogonal frequency-division multiplexing (OFDM) symbol subcarriers (step 412) and each receiver station uses the designed transmit beamformers to adjust the receive beamformer for the MMSE receiver (step 416). In the example flow of FIG. 4, the precoding matrix codebook design begins by generating a predetermined set of candidate beamforming matrices using a predetermined zero-forcing beamforming algorithm (step 403). The predetermined set of candidate beamforming matrices may include all possible precoding matrices $W_1, W_2, W_3, \ldots W_M$ that can be generated by the transmitter station, where each precoding matrix $W_i$ contains transmit beamforming vectors $w_1, w_2, w_3, \ldots w_m$ for the receiver stations. For example, if the transmitter station has four transmit antennas, this implies that at most 4 receiver stations can be simultaneously supported in the zero-forcing multi-user beamforming mode. And if K is the size of the channel vector feedback codebook (that is used to feed back effective channel information), then for a given zero-forcing algorithm, the maximum number of possible precoding matrices is:

$$M_{max} = \binom{K}{4} + \binom{K}{3} + \binom{K}{2} + K. \quad [7]$$

If the shared preceding matrix codebook were formed from all of the predetermined set of candidate beamforming matrices, the size of the codebook would require a relatively large control bandwidth for any codebook index that is fed forward, insofar as the resulting codebook would require a maximum of $R=\log_2(M_{max})$ bits to address the codebook using a fixed mapping scheme. In addition, when an uncompressed feedforward codebook is used to decode precoded pilot signals, a relatively significant decoding complexity would be imposed, insofar as the receiver must evaluate the received precoded pilot signal(s) against all possible candidate preceding pilot vectors in the feedforward codebook.

However, the size of the preceding matrix codebook can be reduced by noting that several preceding matrices are not optimal or are unlikely to be used for obtaining optimal capacities. While unlikely candidate beamforming matrices can be identified using any desired technique, in selected embodiments, the unlikely candidate beamforming matrices can be identified by calculating a condition number for each preceding matrix to identify any matrix whose condition number exceeds a predetermined and/or programmable threshold value (step 405). By filtering out or removing any preceding matrix that exceeds the threshold, sub-optimal preceding matrices are removed and the codebook is effectively compressed (step 407) prior to distribution to the transmitter and receiver stations (step 409). By removing sub-optimal preceding matrices, not only is the size of the shared feed forward codebook reduced, but the attendant search complexity at the receiver station is reduced. In addition, the signaling overhead associated with distributing the compressed preceding matrix codebook to the transmitter and receiver stations (as indicated by the lines connecting block 409 to blocks 410 and 414) is reduced, though the compressed preceding matrix codebooks may be pre-installed on the transmitter and receiver stations or otherwise distributed beforehand.

In accordance with various embodiments, the threshold can be a variable value that is adjusted, and/or can be set a priori depending on several factors such as number of receiver stations in the system, deployment scenarios etc. For example, for a transmitter station located in a rural setting, the threshold may be adjusted down to more effectively compress the feed forward codebook. On the other hand, the threshold may be adjusted up for urban settings to provide additional preceding matrix options for the transmitter station.

By now it should be appreciated that there has been provided a method and system for feeding forward reference signal information to receivers in a multiple input, multiple output (MIMO) space division multiple access (SDMA) system. As disclosed, a transmitting device (e.g., a base station) receives channel state estimate information from a plurality of receiving devices (e.g., user equipment devices). The transmitting device uses this information to generate transmit beamforming vectors, such as by using a zero-forcing beamformer to output transmit beamforming vectors. The transmit beamforming vectors are assembled into a reference signal matrix which is then quantized, such as by selecting an index from a reference signal codebook corresponding to the reference signal matrix, where the reference signal codebook includes a plurality of candidate reference signal matrices, each of which meets a predetermined condition number requirement. In various embodiments, each of candidate reference signal matrices in the codebook has a condition number that is lower than a predetermined threshold value, where the predetermined threshold value may be fixed, variable or dynamically adjusted. The selected index, which is representative of the assembled reference signal matrix, may then be fed forward to at least one of the plurality of receiving devices for use in generating receive beamforming vectors at each receiving device. After feeding forward the selected index, the transmitting device may use the transmit beamforming vectors as weighting vectors for signals transmitted by the transmitting device to the at least one of the plurality of receiving device.

In another form, there is provided a forward link signaling method and system for multi-user multiple input, multiple output (MIMO) system. As disclosed, a transmission matrix W is constructed at a transmitter based on feedback of codewords from a plurality of receivers, where the transmission matrix W is selected from a first compressed codebook having a plurality of candidate transmission matrices. For example, the transmission matrix W may be constructed by using regularized zero-forcing beamforming to design a plurality of transmit beamforming vectors that are assembled to form the transmission matrix W. In this example, X is defined by selecting a plurality of predefined codewords from a feedback codebook and W is defined by a regularized zero-forcing function $W=X(X^H X)^{-1}$. Each of the candidate transmission matrices in the compressed codebook is associated with a predefined performance metric and meets a predetermined threshold for the metric. In an example implementation, the performance metric is a condition number $W^H W$ so that each of the plurality of candidate transmission matrices in the first compressed codebook has a condition number that is less than the predetermined threshold. In another example implementation, the performance metric is a condition number of a matrix $X^H X$ so that each of the plurality of candidate transmission matrices in the first compressed codebook has a condition number that is less than the predetermined threshold. In yet another example implementation, the performance metric is a sum of the values $|w_i u_i|^2$ evaluated over all the columns, where $u_i$ is an $i^{th}$ codeword and $w_i$ is an $i^{th}$ column of a candidate transmission matrix being evaluated, such that each of the plurality of candidate transmission matrices in the first compressed codebook has a condition number that is greater than the predetermined threshold. Once the transmission matrix W is constructed, feed forward information representative of the transmission matrix W is transmitted to the receiver(s) to enable MMSE receiver design of a combining vector u for the receiver. In various embodiments, the feed forward information is sent as one or more precoded reference signals that are precoded using one or more vectors uniquely representative of the transmission matrix W, or as bits uniquely identifying the transmission matrix W. Each receiver uses a second compressed codebook corresponding to the first compressed codebook to extract the transmission matrix W from the feed forward information. In various embodiments, the predetermined threshold may be fixed, or may be dynamically modified by the transmitter based on a current network state, or may be implemented as a plurality of thresholds, where each threshold is used for a different deployment scenario.

In yet another form, there is provided a method and system for compressing a feed forward codebook. As discloses, a plurality of candidate reference signal matrices are assembled, where the plurality of candidate reference signal matrices correspond to all possible combinations of channel state values. Thus, for every possible $X=[u_1\ u_2\ \ldots\ u_m]$—where $u_i$ takes all possible values in its own codebook—there is a corresponding candidate transmit beamforming matrix W. Next, one or more candidate reference signal matrices are removed from the plurality of candidate reference signal matrices so as to define a reduced subset of the candidate reference signal matrices. For example, this can be done by applying a predefined performance metric to one or more candidate reference signal matrices and removing any candidate reference signal matrix if a predetermined threshold associated with said metric is not met. In this way, the removal of even a single candidate reference signal matrix constitutes a compression of the candidate set.

The methods and systems for efficiently providing preceding matrix information to receivers in a wireless, multi-user, multi-input, multiple output (MIMO) SDMA system as shown and described herein may be implemented in whole or in part with software stored on a computer-readable medium and executed as a computer program on a general purpose or special purpose computer to perform certain tasks. For a hardware implementation, the elements used to perform various signal processing steps at the transmitter (e.g., receiving and decoding quantized channel vector information, designing the transmit beamforming vectors, selecting a feed forward index or precoded reference signal to represent the transmit beamforming matrix, preconditioning the precoded signals, coding and modulating the data, preceding the modulated signals, and so on) and/or at the receiver (e.g., recovering the transmitted signals, estimating channel information, feeding back quantized channel vector information, demodulating and decoding the recovered signals, receiving and decoding quantized preceding matrix information, designing the receive beamforming vectors, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various multi-user MIMO systems and methods for using same, the present invention is not necessarily limited to the example embodiments illustrate herein. For example, various embodiments of a MIMO preceding system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A forward link signaling method for a multi-user multiple input, multiple output (MIMO) system, comprising:
   receiving at a transmitting device channel state estimate information from a plurality of receiving devices;
   generating transmit beamforming vectors;
   assembling the transmit beamforming vectors into a reference signal matrix;
   selecting an index from a compressed reference signal codebook corresponding to the reference signal matrix, where the compressed reference signal codebook comprises a plurality of candidate reference signal matrices, each of which is associated with a predefined performance metric and meets a predetermined threshold for said metric; and
   feeding forward the index that is representative of the assembled reference signal matrix to at least one of the plurality of receiving devices for use in generating receive beamforming vectors at each receiving device.

2. The method of claim 1, where generating transmit beamforming vectors comprises using a zero-forcing beamformer to output transmit beamforming vectors.

3. The method of claim 1, where the predefined performance metric for each of the plurality of candidate reference signal matrices is a condition number that is lower than a predetermined threshold value.

4. The method of claim 3, where the predetermined threshold value is a fixed threshold value.

5. The method of claim 3, where the predetermined threshold value is a variable threshold value.

6. The method of claim 3, further comprising dynamically adjusting the predetermined threshold value.

7. The method of claim 1, further comprising using the transmit beamforming vectors at the transmitting device as weighting vectors for signals transmitted by the transmitting device to the at least one of the plurality of receiving devices.

8. A forward link signaling method for a multi-user multiple input, multiple output (MIMO) system, comprising:
   constructing a transmission matrix W at a transmitter based on feedback of requested codewords from a plurality of receivers, where the transmission matrix W is selected from a first compressed codebook comprising a plurality of candidate transmission matrices, each of which is associated with a predefined performance metric and meets a predetermined threshold for said metric; and
   transmitting feed forward information representative of the transmission matrix W to at least one receiver to enable minimum mean square error (MMSE) receiver design of a combining vector u for the receiver, where the receiver uses a second compressed codebook that is identical to the first compressed codebook to extract the transmission matrix W from the feed forward information.

9. The method of claim 8, where transmitting feed forward information comprises sending one or more precoded reference signals that are precoded using one or more vectors uniquely representative of the transmission matrix W.

10. The method of claim 8, where transmitting feed forward information comprises sending bits uniquely identifying the transmission matrix W.

11. The method of claim 8, where constructing the transmission matrix W comprises using regularized zero-forcing beamforming to design a plurality of transmit beamforming vectors that are assembled to form the transmission matrix W.

12. The method of claim 8, where the predefined performance metric is a condition number $W^H W$ so that each of the plurality of candidate transmission matrices in the first and second compressed codebooks has a condition number that is less than the predetermined threshold.

13. The method of claim 8, where the predefined performance metric is a condition number of a matrix $X^H X$ so that each of the plurality of candidate transmission matrices in the first and second compressed codebooks has a condition number that is less than the predetermined threshold.

14. The method of claim 8, where the predefined performance metric is a sum of the values $|w_i u_i|^2$ evaluated over all the columns, where $u_i$ is an $i^{th}$ codeword and $w_i$ is an $i^{th}$ column of a candidate transmission matrix being evaluated, such that each of the plurality of candidate transmission matrices in the first and second compressed codebooks has a condition number that is greater than the predetermined threshold.

15. The method of claim 8, where X is defined by selecting a plurality of predefined codewords from a feedback codebook and W is defined by a zero-forcing function $W=X(X^H X)^{-1}$.

16. The method of claim 8, where the predetermined threshold is fixed.

17. The method of claim 8, where the transmitter dynamically modifies the predetermined threshold based on a network state.

18. The method of claim 8, where the predetermined threshold comprises a plurality of thresholds, where each threshold may be used for a different deployment scenario.

19. A forward reference signaling method for a multiple input, multiple output (MIMO) space division multiple access (SDMA) system, comprising:
   feeding back to a transmitter effective a feedback codeword u representing effective channel information from a receiver;
   receiving a feed forward signal representative of a transmission matrix W which is generated by using a plurality of transmit beamforming vectors which are generated based at least in part on the a feedback codeword u;
   extracting at the receiver the transmission matrix W from the feed forward signal by using a compressed codebook comprising a plurality of candidate transmission matrices, each of which is associated with a predefined performance metric and meets a predetermined threshold for said metric; and
   using an MMSE receiver at the receiver to generate a receive beamforming vector from the extracted transmission matrix W.

20. The method of claim 19, where receiving a feed forward signal comprises receiving one or more precoded reference signals that are precoded using one or more vectors uniquely representative of the transmission matrix W.

21. The method of claim 19, where receiving a feed forward signal comprises receiving bits uniquely identifying the transmission matrix W.

22. The method of claim 19, where the transmission matrix W is constructed at the transmitter using regularized zero-forcing beamforming to design a plurality of transmit beamforming vectors that are assembled to form the transmission matrix W.

23. The method of claim 19, where the predefined performance metric is a condition number $W^H W$ so that each of the plurality of candidate transmission matrices in the compressed codebook has a condition number that is less than the predetermined threshold.

24. The method of claim 19, where the predefined performance metric is a condition number of a matrix $X^H X$ so that each of the plurality of candidate transmission matrices in the compressed codebook has a condition number that is less than the predetermined threshold.

25. The method of claim 19, where the predefined performance metric is a sum of the values $|w_i u_i|^2$ evaluated over all the columns, where $u_i$ is an $i^{th}$ codeword and $w_i$ is an $i^{th}$ column of a candidate transmission matrix being evaluated, such that each of the plurality of candidate transmission matrices in the compressed codebook has a condition number that is greater than the predetermined threshold.

26. The method of claim 19, where the predetermined threshold is fixed.

27. The method of claim 19, where the predetermined threshold is dynamically modified based on a network state.

28. The method of claim 19, where the predetermined threshold comprises a plurality of thresholds, where each threshold may be used for a different deployment scenario.

* * * * *